United States Patent [19]

Shah

[11] Patent Number: 5,541,283
[45] Date of Patent: Jul. 30, 1996

[54] ONE-POT POLYEPOXIDE RESIN FORMULATIONS COMPRISING GLYCIDYL ESTER AND LATENT CURATIVE

[75] Inventor: Dilipkumar N. Shah, Wescosville, Pa.

[73] Assignee: Air Products and Chemicals, Inc., Allentown, Pa.

[21] Appl. No.: 544,225

[22] Filed: Oct. 18, 1995

Related U.S. Application Data

[63] Continuation of Ser. No. 171,042, Dec. 21, 1993, abandoned.

[51] Int. Cl.⁶ .......................... C08G 59/00; C08G 65/08; C08G 65/14
[52] U.S. Cl. .................................... 528/103.5; 528/94
[58] Field of Search ................................... 528/94, 103.5

[56] References Cited

U.S. PATENT DOCUMENTS 4,859,761   8/1989   Flury et al. ........................ 528/123

FOREIGN PATENT DOCUMENTS 62-127317   9/1987   Japan ........................ C08G 59/20

*Primary Examiner*—Frederick Krass
*Attorney, Agent, or Firm*—Russell L. Brewer; Mary E. Bongiorno

[57] ABSTRACT

This invention relates to improved on component polyepoxide resins having enhanced physical and elastic properties. The polyepoxides resins comprise a polyepoxide resin based on a polyglycidyl ether of a phenolic type compound and a latent amine curative. The improvement in the polyepoxide resin formulation comprises incorporating an ester component having monofunctional reactivity with an amine hydrogen and a latent amine curative having from 3 to 10, and preferably 3 to 5 epoxide reactive hydrogen atoms into the epoxy resin. The glycidyl ester of versatic acid is preferred.

4 Claims, No Drawings

ONE-POT POLYEPOXIDE RESIN FORMULATIONS COMPRISING GLYCIDYL ESTER AND LATENT CURATIVE

This is a continuation of application Ser. No. 08/171,042 filed Dec. 21, 1993, now abandoned.

FIELD OF THE INVENTION

This invention pertains to one pot epoxy resin formulations.

BACKGROUND OF THE INVENTION

One pot polyepoxide resin formulations are well known and are largely based on the use of latent amine curing agents. Representative patents include:

U.S. Pat. No. 5,223,172 discloses a one pot polyepoxide system having enhanced shelf stability. Dicyandiamide is used as a latent curative.

U.S. Pat. No. 3,842,035 discloses heat curable powder compositions using dry blended resins. A slow curable and fast curable composition is utilized in combination with a latent amine curative and curing accelerator.

SUMMARY OF THE INVENTION

This invention relates to improved "one pot" polyepoxide resin formulations comprising a polyepoxide resin based on a polyglycidyl ether of a phenol and a latent amine curative. The improvement for forming a shelf stable "one pot" polyepoxide resin formulation having enhanced physical and elastic properties comprises incorporating an aliphatic ester component having monofunctional reactivity into the epoxy formulation. There are several advantages associated with the one pot polyepoxide resin of this invention and these advantages include:

- an ability to produce a shelf stable product which, upon curing, is well suited for civil engineering and industrial coating applications requiring chemical and moisture resistance;
- an ability to produce a shelf stable product polyepoxide resin having excellent flexibility and impact strength;
- an ability to produce a shelf stable product polyepoxide resin which has a high degree of elongation or elasticity with reduced levels of flexibilizer;
- an ability to formulate a cured polyepoxide resin which has low volatile organic content (VOC), thus minimizing environmental dangers associated with many flexibilized polyepoxide resin systems; and,
- an ability to form environmentally safe polyepoxide resins which will cure at ambient temperature and yet have good elastomeric properties.

DETAILED DESCRIPTION OF THE INVENTION

In producing the curable polyepoxide resin, a recommended formulation for producing the improved flexibilized polyepoxide resin is as follows:

1. Polyglycidyl ether of an aromatic alcohol, e.g., a phenol type component—40 to 100 parts by weight;
2. Monofunctional ester amine reactive component—10 to 40 parts by weight;
3. Latent amine curative having from 3 to 10 epoxide reactive hydrogen atoms—0.6 to 1.5, preferably 0.9 to 1.1, equivalents amine hydrogen per equivalent of amine hydrogen reactive component present in components 1 and 2 above.

Only through a selected combination of three key ingredients; i.e., (1) polyglycidyl ether of a phenol type compound; (2) monofunctional and amine reactive aliphatic ester; and (3) an amine curative having at least 3 epoxide reactive hydrogen atoms, can the highly elastomeric epoxy resins having the excellent physical properties be generated.

The polyepoxide useful for practicing the present invention are those polyglycidyl ethers of phenolic type compounds. The epoxide equivalents of these glycidyl ethers is greater than one and the equivalent weight ranges from 150 to 20,000, preferably 150 to 1,000. Polyglycidyl ethers of diphenylol propane or bisphenol A are particularly suited as polyepoxides for the production of coatings and resin products for civil engineering applications. Others include polyglycidyl ethers of phenol/formaldehyde and bisphenol/formaldehyde novolacs, as well as the polyglycidyl ethers of tri(hydroxyphenyl)methane and tetra(hydroxyphenyl)ethane and propane.

The monofunctional and aliphatic amine reactive component used in the polyepoxide formulation is an aliphatic ester component having an amine hydrogen reactive substituent. The aliphatic component is monofunctional in that it reacts only with a single hydrogen of the amine group and, thus, it is a chain blocking agent, as opposed to a crosslinking agent, thus reducing the level of cross-links in the final polyepoxy resin product. The preferred monofunctional and aliphatic amine reactive component used in forming the polyepoxide resin is a monofunctional epoxide, i.e., a glycidyl ester of $C_{12}$ to $C_{14}$ aliphatic carboxylic acids such as versatic acid.

The amine curative for forming the cured polyepoxide resin product is one having a plurality of amino hydrogen atoms, e.g., 3 to 10, and preferably 3 to 4, hydrogen atoms which are reactive with epoxide groups. Amine curatives having a higher proportion of hydrogen atoms and approaching the upper end of the above recited range tend to effect greater crosslinking than do amine curatives having lesser hydrogen atoms and the resulting epoxide products tend to be more rigid and exhibit lesser levels of elongation than do the polyepoxide resins cured with amine curatives having the lower levels within the middle of the range of amine hydrogen atoms. Typically, the amine curative will have from about 3 to 4 reactive hydrogen atoms and a molecular weight ranging from about 70 to 250. Examples of latent amine curatives include dicyandiamide and imidazole derivatives. Also guanamine powders formed by the reaction of dicyandiamide with nitrites can be used. Other latent amine curing agents commonly used in the prior art may also be used.

The range of components based on one hundred parts by weight of resin forming components, i.e., polyglycidyl ether or phenol, monofunctional and amine reactive aliphatic ester component, is from about 40 to 90, preferably about 50 to 70 parts by weight of polyglycidyl ether of a phenol and 10 to 60 parts of the monofunctional aliphatic ester. The level of amine curative component is largely dependent upon the physical properties desired. In many cases, a stoichiometric level, based on the equivalents epoxide in the polyglycidyl ether of a phenol type compound, and the monofunctional aliphatic ester component (the resin forming components) may not be utilized. Generally, though, the amine curative is incorporated at a level to provide from 0.6 to 1.5, preferably 0.9 to 1.1, equivalents active amine hydrogen atoms per equivalent of the resin forming components. In the preferred embodiments, a polyglycidyl ether of bisphenol A having an equivalent weight from 150 to 250, a glycidyl ester of a $C_{12-14}$ carboxylic acid; 600 to 1800 is used and the amine curative is incorporated at a level capable of reaction with 0.9 to 1.1 equivalents amine hydrogen based on those equivalents in the resin forming components.

To summarize, the physical properties and particularly the degree of elasticity and shelf life is generally dependent upon the ratio of monofunctional epoxide, e.g., the glycidyl ester to polyglycidyl ether of phenol. Although the functionality of the amine curative is a factor, control of elasticity is primarily maintained via the monofunctional amine reactive component. The monofunctional glycidyl ester acts as a capping agent and it not only reduces the amount of cross-linking through the amine curative, but it extends shelf life of the "one pot" formulation. As might be expected, as cross-linking is reduced the elasticity of the cured epoxy is increased. The amount of cross-linking may also be controlled through the amine curative functionality. Amines with high levels of available hydrogens for cross-linking generate less elastic epoxies.

The following examples are provided to illustrate various embodiments of the invention and are not intended to restrict the scope thereof. All parts or parts by weight or percentages are expressed as weight percentages unless otherwise specified.

EXAMPLE 1

PREPARATION OF CURED EPOXY TEST SPECIMENS

COMPARATIVE EFFECT OF REACTIVE DILUENT

The elastomeric epoxy is prepared by thoroughly mixing the flexibilizer, monofunctional and difunctional amine reactive component, latent amine curing agent and epoxy resin.

After weighing all components, the formulations were mixed thoroughly at low shear rate for about two minutes. Twenty-four hours after mixing and degassing, the viscosity of each of the five formulations was measured. Thereafter, the formulations were stored at 110° F. Viscosities were measured (after equilibrating to room temperature), every week for 4 weeks to evaluate the effect of diluents on the formulation shelf life.

Table 1 sets forth the formulations for five one-component adhesive formulations. Table 2 sets forth the viscosity results.

TABLE 1

| | Formulation | | | | |
|---|---|---|---|---|---|
| | % by wt. | | | | |
| Resin | 1 | 2 | 3 | 4 | 5 |
| Epon 828 | 80 | 80 | 80 | 83 | 100 |
| Epodil 748 | 20 | — | — | — | — |
| Epodil 742 | — | 20 | — | — | — |
| Epodil 749 | — | — | 20 | — | — |
| Cardura E-10 | — | — | — | 17 | — |
| Ancamine 2337XS | 37 | 40 | 43 | 42 | 40 |

Epon 828 is a trademark identifying the Diglycidyl Ether of a Bisphenol A based epoxy resin from Shell.

TABLE 1-continued

| | Formulation | | | | |
|---|---|---|---|---|---|
| | % by wt. | | | | |
| Resin | 1 | 2 | 3 | 4 | 5 |

Epodil 748 is Alkyl ($C_{12}$–$C_{14}$) Glycidyl Ether-monofunctional reactive diluent.
Epodil 742 is Cresyl Glycidyl Ether-monofunctional reactive diluent.
Epodil 749 is Neopentyl Glycol Diglycidyl Ether.
Cardura E-10 is alkyl Glycidyl Ester of Versatic Acid-monofunctional.
Ancamine 2337XS is a trademark identifying modified aliphatic amine.

TABLE 2

| | Viscosity (Poise) | | | | |
|---|---|---|---|---|---|
| | Formulation | | | | |
| | 1 | 2 | 3 | 4 | 5 |
| Initial | 13.1 | lumpy | 39.8 | 42.8 | 350 |
| after 4 weeks | gelled | gelled | gelled | 58.7 | 732 |

The above results show that through the use of the aliphatic ester, i.e., the Cardura E diluent, one was afforded an epoxy resin having extended shelf life with little viscosity build over the 4 week storage period. The glycidyl ethers of phenols, neopentyl glycol and the like resulted in premature gelation.

To summarize, by the use of a reactive diluent based on glycidyl esters, one can readily formulate one pot epoxy resin adhesives without adversely affecting shelf stability.

What is claimed is:

1. In a one pot epoxy resin formulation comprising a diglycidyl ether of bisphenol A and a latent amine curative having at least 3 epoxy reactive hydrogen atoms wherein the curative is incorporated at a level of from about 0.6 to 1.5 equivalents of epoxy reactive hydrogen atoms per equivalent epoxy group in the formulation, the improvement for enhancing shelf stability and elasticity of the resulting epoxy resin which comprises, in combination therewith a glycidyl ester of versatic acid wherein said formulation comprises, based on 100 parts of diglycidyl ether of bisphenol A and glycidyl ester of versatic acid from 40 to 90 parts by weight diglycidyl ether of bisphenol A having an epoxide equivalent weight of about 150 to about 1,000; and from 10 to 60 parts by weight of glycidyl ester of versatic acid.

2. The epoxy resin formulation of claim 1 wherein the latent amine curative has 3 to 4 epoxy reactive hydrogen atoms.

3. The epoxy resin formulation of claim 2 wherein the ratio of reactive hydrogen atoms to equivalent epoxy groups is from 0.9 to 1.1.

4. The epoxy resin formulation of claim 2 wherein the amine curative has a molecular weight of from 70 to 250.

* * * * *